Patented Nov. 19, 1929

1,736,063

UNITED STATES PATENT OFFICE

PAUL VIRCK, OF DESSAU IN ANHALT, GERMANY, ASSIGNOR, BY MESNE ASSIGNMENTS, TO GENERAL ANILINE WORKS, INC., OF NEW YORK, N. Y., A CORPORATION OF DELAWARE

CONDENSATION PRODUCT CONTAINING SULPHUR

No Drawing. Application filed November 7, 1925, Serial No. 67,665, and in Germany November 14, 1924.

Resinous bodies obtainable by action of sulphur chloride on hydroxybenzenes have the property of being adsorbed from dilute alkaline solutions by textile fibres and other substrata and in this condition of fixing dyestuffs to produce dyeings fast to washing. They have the disadvantage, however, that they colour the substratum a dirty yellow so that the dyeings obtained with acid dyestuffs are unfavourably affected in respect to their tint and clearness.

According to the invention the resinous bodies containing sulphur are converted by treatment with strong sulphuric acid at a raised temperature and by heating the resinous bodies thus obtained for some time at 200—240° C. in the presence of a hydroxybenzene in excess into compounds which are colourless when adsorbed on textile fibres and act as mordants for basic dyestuffs. The excess of hydroxybenzene is eliminated by distillation in a vacuum. The product of condensation forms, after cooling, a brittle mass soluble in a solution of sodium carbonate to a nearly colourless solution, from which it is not precipitated in the form of resinous bodies if heated with acids to the boiling point, but in the form of colourless flakes.

The following example illustrates the invention without limiting it, the parts being by weight:

Example 1.—To the product of reaction of 94 parts of hydroxybenzene with 68 parts of sulphur chloride 57 parts of sulphuric acid of 100% strength are slowly added while stirring at a temperature of 90–100° C. A lively reaction occurs. The temperature is slowly raised within 1–2 hours to 210–220° C., small quantities of hydroxybenzene being added so that always a surplus of it is present. The excess of hydroxybenzene is distilled in a vacuum at a temperature of 240° C. The product thus obtained dissolves in sodium carbonate to a colourless solution.

What I claim is,—

1. Process for the production of colorless compounds containing sulphur and capable of being adsorbed by textile fibers and other substrata which comprises treating a resinous body, obtainable by the action of sulphur chloride on a hydroxybenzene, with strong sulphuric acid at a temperature of about 100° C., and raising the temperature slowly while treating the resulting material with an excess of a hydroxybenzene until the temperature reaches about 220° C.

2. As a new product, a colorless compound containing sulphur and capable of being adsorbed by textile fibers and other substrata, obtainable by treating a resinous body, obtainable by the action of sulphur chloride on a hydroxybenzene, with strong sulphuric acid at a temperature of about 100° C., and raising the temperature slowly while treating the resulting material with an excess of a hydroxybenzene until the temperature reaches about 220° C., said product being soluble in sodium carbonate solution from which it is precipitated in the form of colorless flakes by the addition of acid and heating.

In testimony whereof I affix my signature.

PAUL VIRCK.